United States Patent
Cardon

(10) Patent No.: US 7,719,144 B2
(45) Date of Patent: May 18, 2010

(54) VERTICAL ACTUATOR HAVING A GRAVITY COMPENSATION DEVICE

(75) Inventor: Vincent Cardon, Arcenant (FR)

(73) Assignee: Etel S.A., Motiers (CH)

( * ) Notice: Subject to any disclaimer, the term of this patent is extended or adjusted under 35 U.S.C. 154(b) by 121 days.

(21) Appl. No.: 12/206,081

(22) Filed: Sep. 8, 2008

(65) Prior Publication Data
US 2009/0066168 A1 Mar. 12, 2009

(30) Foreign Application Priority Data
Sep. 10, 2007 (CH) ........................... 1419/07

(51) Int. Cl.
*H02K 41/02* (2006.01)
(52) U.S. Cl. ............. 310/12.33; 310/12.01; 310/89
(58) Field of Classification Search ............. 310/12.01, 310/12.33, 12.25, 13, 89
See application file for complete search history.

(56) References Cited

U.S. PATENT DOCUMENTS

| | | | | |
|---|---|---|---|---|
| 5,434,459 A | * | 7/1995 | Pinkerton | 310/20 |
| 5,548,167 A | * | 8/1996 | Belikov | 310/12.24 |
| 6,326,706 B1 | * | 12/2001 | Zhang | 310/12.31 |
| 6,653,753 B1 | * | 11/2003 | Kawano et al. | 310/14 |
| 6,879,064 B2 | * | 4/2005 | Kobayashi et al. | 310/12.01 |
| 7,071,584 B2 | * | 7/2006 | Kawano et al. | 310/14 |
| 7,372,178 B2 | * | 5/2008 | Ahmed et al. | 310/12.25 |
| 2004/0066097 A1 | * | 4/2004 | Kobayashi et al. | 310/13 |
| 2005/0212363 A1 | * | 9/2005 | Okubo | 310/14 |
| 2006/0061219 A1 | | 3/2006 | Hazelton | |
| 2006/0163951 A1 | * | 7/2006 | Ahmed et al. | 310/12 |

* cited by examiner

*Primary Examiner*—Thanh Lam
(74) *Attorney, Agent, or Firm*—Kenyon & Kenyon LLP

(57) ABSTRACT

A vertical actuator has a stationary part that includes an upper part made of magnetic material which is magnetically separated from a yoke which bears a coil. The upper magnetic part generates an overall reluctance force on the movable part of the actuator which, over the entire functional range of the actuator, is slightly greater than the gravitational force. When the coil is not energized, the movable part has a position of stable equilibrium which is in the upper section of this functional range.

12 Claims, 4 Drawing Sheets

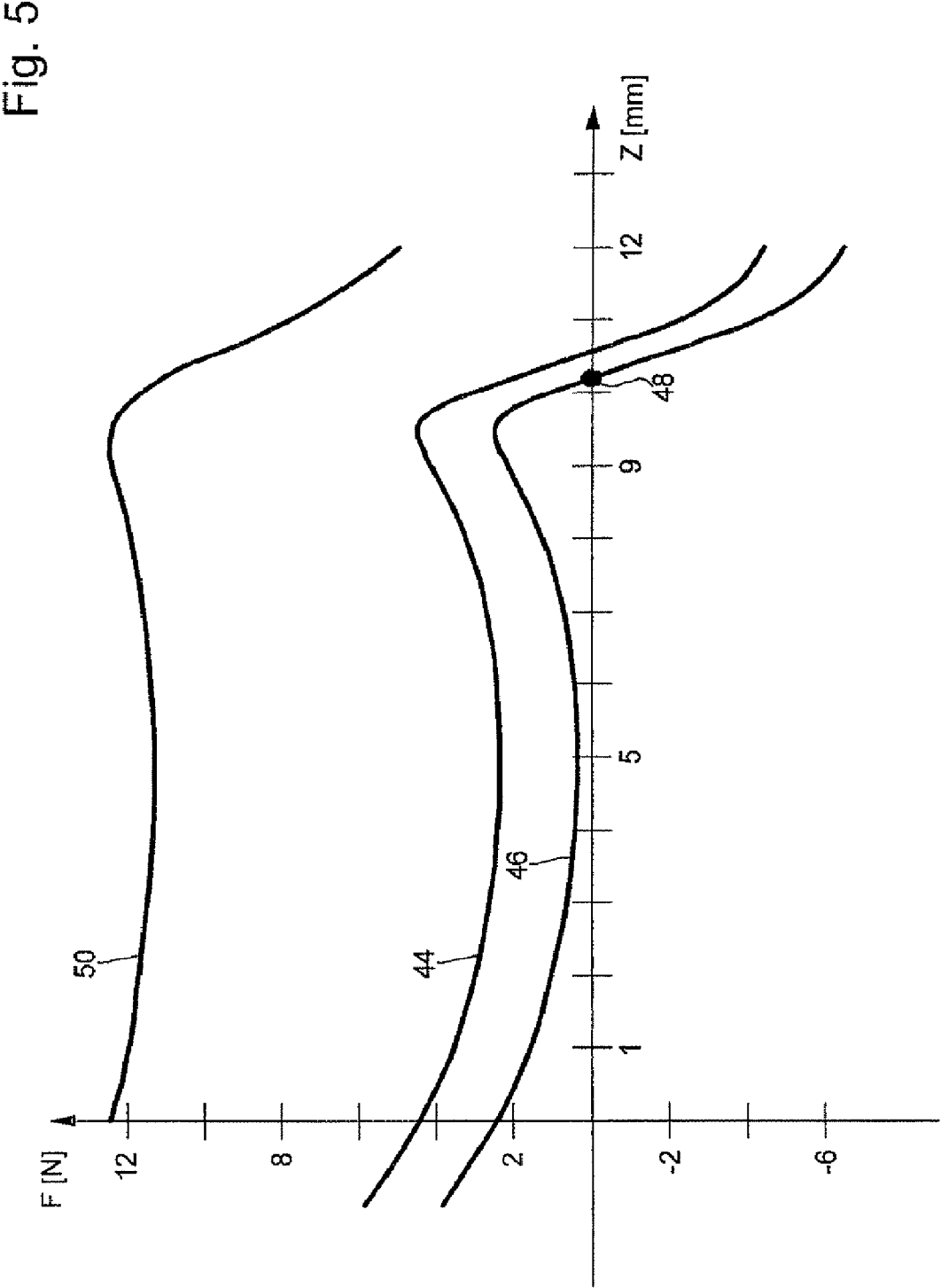

VERTICAL ACTUATOR HAVING A GRAVITY COMPENSATION DEVICE

CROSS-REFERENCE TO RELATED APPLICATIONS

The present application claims priority to Application No. 01419/07, filed in the Swiss Confederation on Sep. 10, 2007, which is expressly incorporated herein in its entirety by reference thereto.

FIELD OF THE INVENTION

The present invention relates to a vertical actuator equipped with device for the compensation of gravity or gravitational force.

For example, the vertical actuator is formed by a linear motor whose movable part shifts vertically. This movable part includes at least one permanent magnet, and the stationary part of the actuator includes a magnet yoke bearing at least one coil. A coil should be understood to be a coil or any winding disposed such that it generates a magnetic field when supplied with electric current. The actuator may be single-phase or multiphase.

BACKGROUND INFORMATION

One problem with vertical actuators is that the movable part, which includes the load that is assigned to the actuator, has a certain mass and therefore is subject to gravity. If there is no mechanism for compensating for this gravity, the movable part generally sinks when the actuator is no longer energized. This movable part may either support itself against a lower end stop, or may be held in a low position due to the magnetic attraction capability of the yoke. This magnetic attraction capability of the fixed-part elements, made of magnetic materials, for the movable part equipped with a permanent magnet is referred to as a reluctance force.

In most practical applications, a low position of the movable part which, e.g., has a tool at its lower end, when the actuator is stationary, that is, when it is no longer supplied with electric current, is very unfavorable. Therefore, it is generally preferred to keep the movable part in a high position when the vertical actuator is stationary. Various systems to compensate for gravity are described in the literature.

For example, the vertical actuator described in U.S. Patent Application Publication No. 2006/0061219 is equipped with a device for pneumatic compensation. The movable part has a central spindle which forms a piston that moves in a stationary cylinder in which compressed air is provided at the bottom. This compressed air exerts an upwardly-directed thrust on the lower surface of this central spindle which allows compensation for gravity and makes it possible to have a pre-defined stable position when the actuator is not being energized. Such a system has various disadvantages. First of all, a relatively bulky, additional device is needed for the weight-compensation function. In addition, it is also necessary to provide a device for ensuring correct movement of the central spindle in the cylinder. Moreover, the feeding of compressed air and its monitoring requires an additional device and the mastery of an additional technology. Such a system is thus relatively complex and costly. Furthermore, it should be noted that the pressure acting on the central spindle must be exerted from below this spindle. Therefore, the area below the spindle is obstructed by the compressed-air device which is disposed at the lower end of the cylinder in which the central spindle of the movable part moves. Consequently, the movable part is unable to bear a load at the bottom of the central spindle. Incidentally, this actuator is provided in order to bear a load above its movable part. This seriously limits the practical applications to be considered.

FIG. 1 is a schematic, vertical cross-sectional view of a conventional actuator of a type which is considered, e.g., within the framework hereof. The description of this vertical actuator 2 and its magnetic performance characteristics illustrated in FIG. 2 makes it possible, based on this precise case, to demonstrate the problem of the conventional systems for which effective solutions are provided as explained below with reference to FIGS. 3 to 5.

Actuator 2 includes a stationary part 4 formed by a cylindrical yoke 8 made of magnetic materials and a coil 10. The coil 10 includes a lower part having a winding implemented in a first direction and an upper part having a winding implemented in a second direction, opposite the first direction. This coil 10 therefore defines a single-phase actuator which, however, is disposed such that the magnetic field generated by the lower part has a direction which is opposite that of the magnetic field generated by the upper part of this coil. This manner of implementing the winding of coil 10 should be familiar to those skilled in the art. Movable part 6 of actuator 2 includes a permanent magnet 14 having axial magnetization, which is mounted on a central spindle or shaft 16 that defines a central geometric axis 18. Two magnetic disks 20 and 21, respectively, are disposed at the two ends of the magnet. These disks make it possible to channel the magnetic flux in the direction of coil 10. Together with magnet yoke 8, they form a magnetic circuit for the magnetic flux, which therefore is coupled to coil 10 when the latter is supplied with electric current.

With the arrangement of coil 10 as illustrated, the functional range provided for this actuator is between, e.g., 0 and 12 mm, as shown on axis Z. Two curves are illustrated in FIG. 2. First upper curve 24 represents the reluctance force as a function of the position of movable part 6 along vertical axis Z. The position of the movable part is defined by the position of the median plane of magnet 14. Thus, in FIG. 1, movable part 6 is illustrated in the 0-position on axis Z, i.e., in the lower position of the functional range provided. It can be seen that coil 10 is shifted slightly downward in relation to the median plane of magnet yoke 8. This median plane corresponds to the 7 mm position. When movable part 6 is located in the 7 mm position, the median plane of permanent magnet 14 thus coincides with the median plane of yoke 8. Because of the symmetry of the resulting configuration of the magnetic elements of actuator 2, the reluctance force exerted by the stationary part on the movable part is equal to zero in this position, as illustrated in FIG. 2. When movable part 6 drops, the reluctance force exerted on the movable part is positive and increases with the distance in comparison to the center position of the yoke. When the movable part moves beyond this center position, the reluctance force becomes negative. Curve 24 thus represents an asymmetry in relation to the median plane of yoke 8, which lies at a level that corresponds to the 7 mm position on vertical axis Z.

Curve 26 represents the resultant force which is exerted on movable part 6 in response to the absence of an electrical supply to coil 10. In the case of actuator 2, a gravitational force of, e.g., 2 N, is provided. Curve 26 is thus similar to curve 24, however shifted downward by a value of 2 N. Therefore, it can be seen that movable part 6 has a position of stable equilibrium approximately in the 2.5 mm position on axis Z. The profile of resulting curve 26 has several disadvantages, which have already been described at least partially above. The position of stable equilibrium of the movable part upon absence of a current supply corresponds to a low position in the functional range of actuator 2. In the event the movable mass includes a tool at its lower end, this tool remains in a low position or drops into such a low position when the current supply is interrupted. In certain instances, this can cause damage to the tool or to the product being produced at the moment, which is situated under this tool. In addition, it can be seen that the slope of curve 26 is relatively small in the vicinity of the equilibrium point. Therefore, the restoring force in the vicinity of the equilibrium position is small, such that the stability of the movable part is small when there is no current supply. Moreover, it can be seen that resultant force 26 decreases monotonically over the functional range of the actuator. The reluctance force exerted on the movable part varies over the entire functional range. Resultant force 26 has a not insignificant value in the high positions of movable part 6.

SUMMARY

Example embodiments of the present invention eliminate or at least reduce the disadvantages mentioned above by providing a vertical actuator whose movable part, upon absence of a current supply, has a position of stable equilibrium which corresponds to a high or upper position of the movable part, a positive resultant force being ensured over the entire functional range of the actuator, such that in response to the absence of a current supply, the movable part is able to reach the position of stable equilibrium from any position of the functional range provided.

For this purpose, a vertical actuator includes a stationary part and a movable part, the stationary part including a magnet yoke and at least one coil which is borne by this magnet yoke, the movable part including at least one permanent magnet which is movably disposed in the interior of the magnet yoke. Additionally, the stationary part includes an upper part made of magnetic material which is arranged above the movable part, the upper part and the yoke being magnetically separated from each other by a part made of non-magnetic material.

Due to the upper part made of magnetic material, a reluctance force which is positive, i.e., is directed upward, may be obtained over the entire functional range of the actuator. Moreover, in the upper area of the functional range or slightly above this functional range, the movable part has a point of stable equilibrium. The upper magnetic part is dimensioned and positioned such that the overall reluctance force exerted on the movable part is greater than the gravitational force exerted on the mass of the movable part. For example, upon absence of a current supply, the resultant force exerted on the movable part is significantly close to zero over the entire functional range of the actuator.

According to an example embodiment of the present invention, a vertical actuator includes: a stationary part including a magnet yoke and at least one coil supported by the yoke; and a movable part including at least one permanent magnet and movably disposed in an interior of the yoke. The stationary part includes an upper magnetic part formed of a magnetic material, the upper magnetic part is arranged above the movable part, and the upper magnetic part and the yoke are magnetically separated from each other by a part formed of a non-magnetic material.

The permanent magnet may be axially magnetized, and the movable part may include a device configured to close the magnetic field, the device, together with the yoke, forming a magnetic circuit adapted to couple the magnetic field to the at least one coil.

The movable part may including a device configured to close the magnetic field, and the device, together with the yoke, may form a magnetic circuit that couples the magnetic field to the at least one coil.

The device may include a magnetic disk provided on each of an upper end and a lower end of the permanent magnet.

The upper magnetic part may include a metal pin having an axis that coincides with a central axis of the movable part.

The upper magnetic part and the yoke may be arranged to direct a reluctance force exerted on the movable part upward, and over an entire functional range of the vertical actuator; the reluctance force may have a value slightly greater than a force of gravity to which the movable part is subjected; and upon an absence of a current supply to the at least one coil, the vertical actuator may have, for the movable part, a point of stable equilibrium located at least one of (a) in an upper section and (b) above the functional range of the vertical actuator.

The magnetic disk provided on the upper end of the permanent magnet may include a recess adapted to receive a portion of the upper magnetic part, e.g., the magnetic disk provided on the upper end of the permanent magnet may include a recess adapted to receive a portion of the metal pin of the upper magnetic part.

The part formed of the non-magnetic material may be arranged as cover of the vertical actuator.

The upper magnetic part may be supported above the movable part by the part formed of the non-magnetic material.

Further features and expects of example embodiments of the present invention are described in more detail below with reference to the appended Figures.

BRIEF DESCRIPTION OF THE DRAWINGS

FIG. 5 shows the curves of the reluctance force and the resultant force which is exerted on the movable part in response to the absence of a current supply, as well as a curve of the total force exerted on the movable part when the actuator is supplied with electric current.

DETAILED DESCRIPTION

Figure 1:
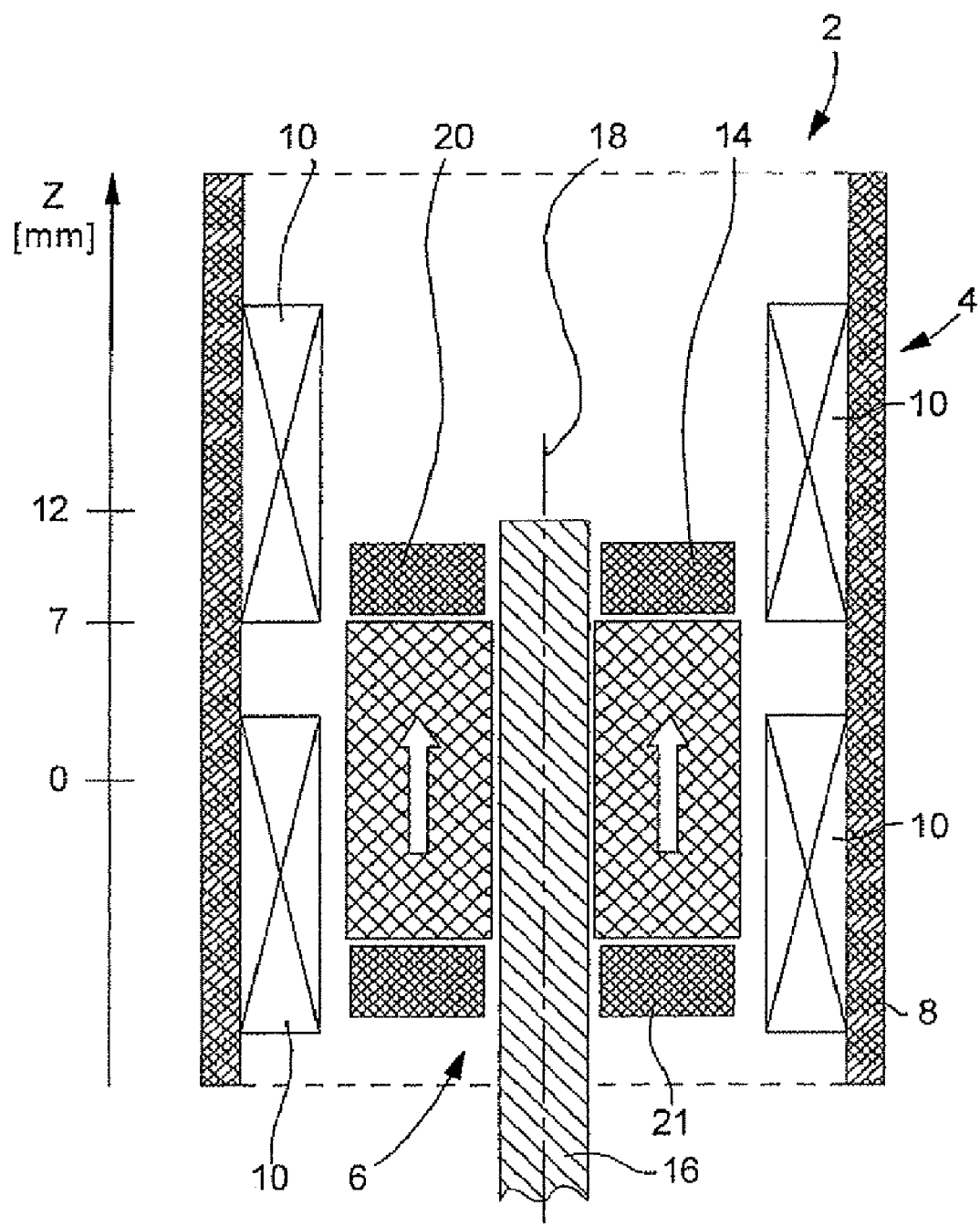
FIG. 1, which is described above, is a cross-sectional view of a conventional vertical actuator.
Figure 2:
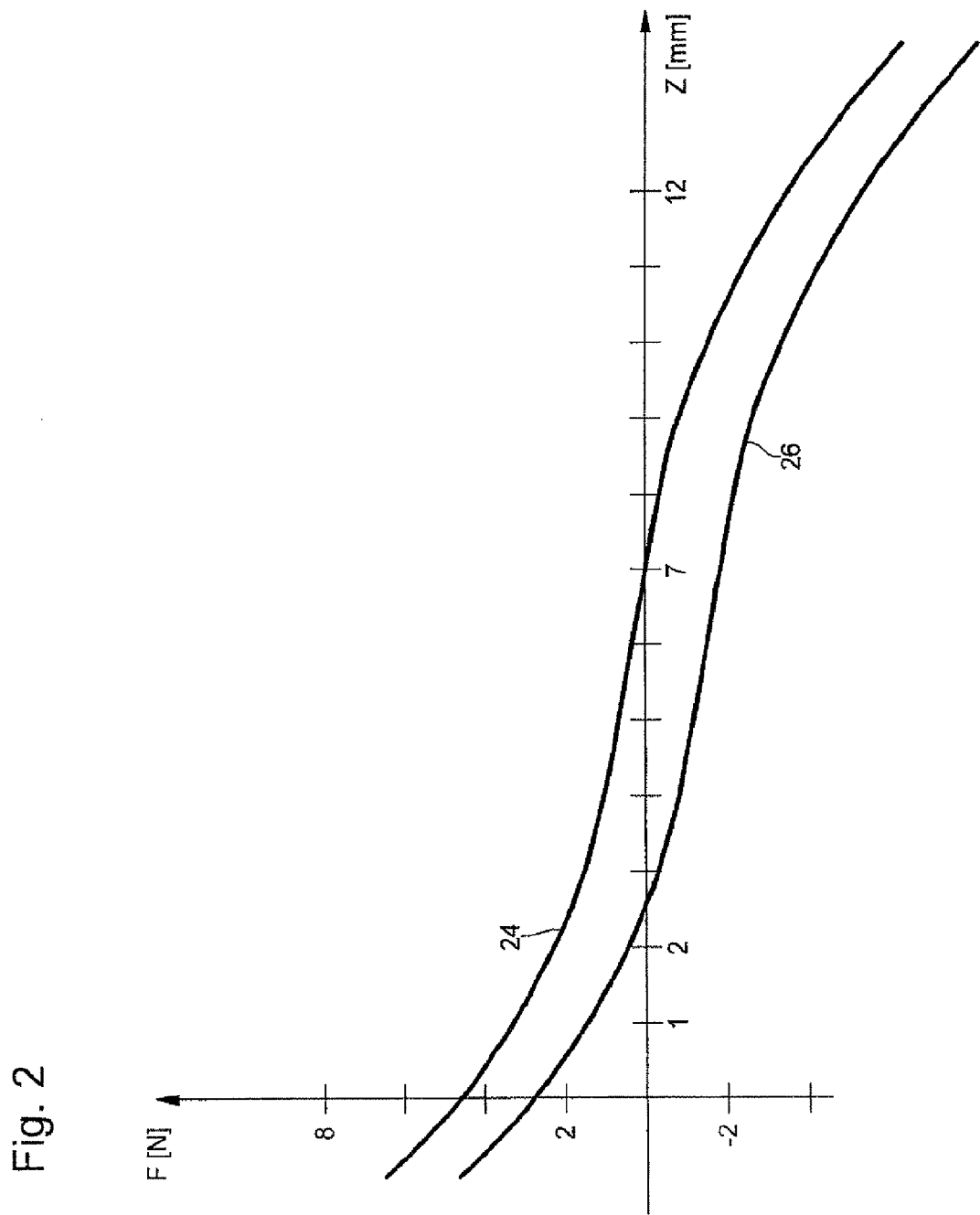
FIG. 2, which is also described above, shows the curves of the reluctance force and the resultant force exerted on the movable part of the actuator shown in FIG. 1.
Figure 4:
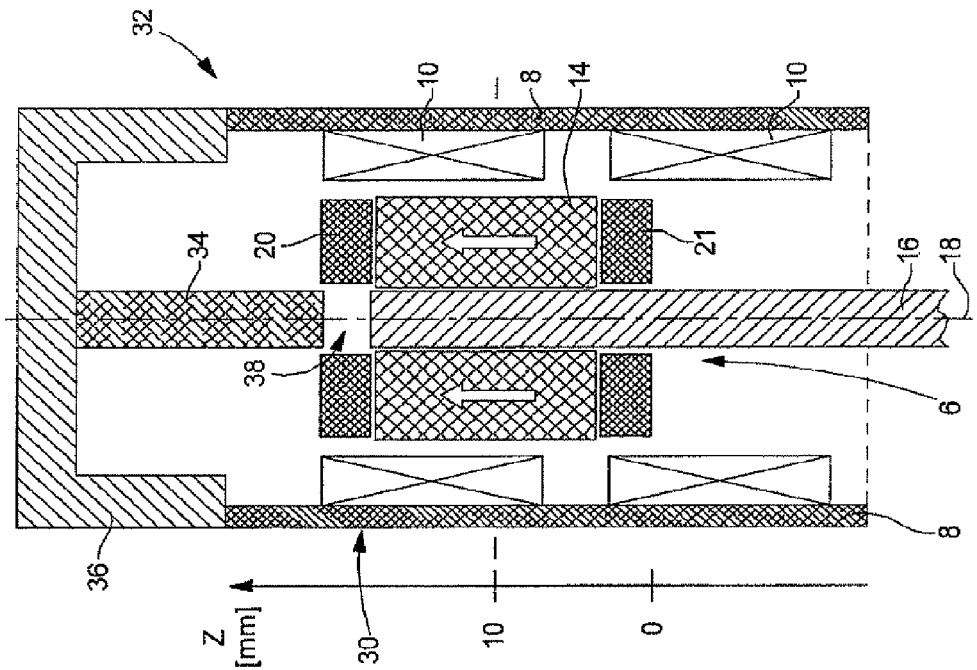
FIGS. 3 and 4 are cross-sectional views of an actuator according to an example embodiment of the present invention, whose movable part is in the lower position and in the upper position, respectively, of the functional range of the actuator.
Figure 3:
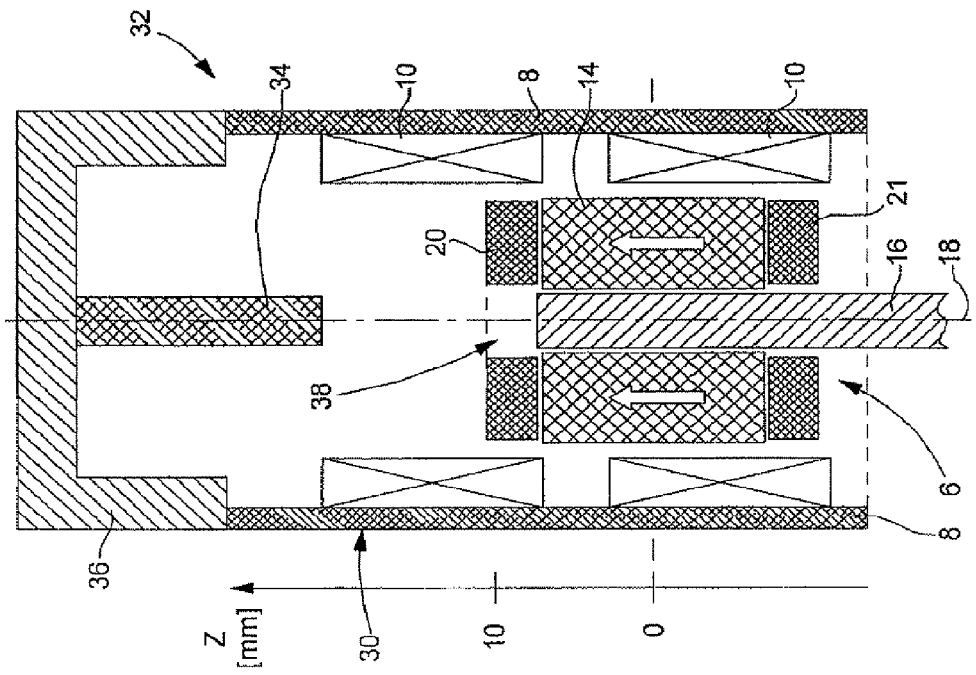

In the following, a vertical actuator according to an example embodiment of the present invention is described with reference to FIGS. 3 to 5. The reference numerals which have already been described in detail before in connection with the actuator in FIG. 1 are not all described again here in detail.

Vertical actuator 32 includes an upper part 34 made of magnetic material arranged above movable part 6. Upper part 34 is a component of stationary part 30 of actuator 32. Part 34 is supported by a part 36 made of non-magnetic material. The part 36 forms a cover for the actuator, e.g., part 36 joins upper magnetic part 34 to magnet yoke 8. However, part 36 magnetically separates upper magnetic part 34 and magnet yoke from each other. Upper magnetic part 34 is thus magnetically isolated from yoke 8.

In this example embodiment, upper magnetic part 34 is formed by a metal pin whose axis coincides with central axis 18 of movable part 6. Other forms and special configurations may also be provided. Furthermore, the magnetic parts of the actuator do not necessarily have to have a main axis. Other forms and configurations are possible.

Magnetic disks 20 and 21, which are arranged at both ends of magnet 14 of the movable part, form a device for closing the magnetic field, these disks together with yoke 8 forming a magnetic circuit which effectively couples the magnetic field to coil 10. The outer surfaces of disks 20 and 21 are crucial for the reluctance effect. The distance between these outer surfaces of disks 20 and 21 and the magnetic parts of stationary part 30 substantially define the value of the reluctance force exerted on movable part 6. Thus, one notices that, given an upward shift of movable part 6, the distance between upper disk 20 and upper magnetic part 34 is decreased down to a very small value, which generates an upwardly directed reluctance force between these two magnetic components that is all the greater as the movable part rises in the functional range of the actuator.

To allow movable part 6 to approach upper part 34, central cutout or recess 38 in upper disk 20 has been left at least partially free. As illustrated in FIG. 4, in which movable part 6 is in the upper position of the functional range, part 34 has a lower surface which is in the plane of the upper surface of disk 20. In this arrangement, in which the position of stable equilibrium of the movable part is slightly above this upper value (which here corresponds to, e.g., 10 mm), metal pin 34 penetrates slightly into cutout 38 of the disk when the coil is not being energized. However, it should be understood that upper magnetic part 34 may have a different form which is provided such that, in its position of stable equilibrium, part 34 is located completely above upper disk 20 of the movable part.

The curve of the overall reluctance force exerted on movable part 6 is illustrated in FIG. 5. This curve 44 clearly differs from curve 24 of the vertical actuator in FIG. 1. Firstly, the overall reluctance force exerted on the movable part, particularly on permanent magnet 14 which is assigned to magnetic disks 20 and 21, is positive over the entire functional range of the actuator, that is, this reluctance force is directed upward over the entire functional range. Since in the present case, a gravitational force of, e.g., 2 N is provided, the overall resultant force upon absence of a current supply is indicated by curve 46. Magnet yoke 8 and the upper magnetic part are arranged such that this overall resultant force is greater than zero, but relatively close to zero, over the entire functional range of the actuator. In other words, the overall reluctance force over the entire functional range of the actuator has a value which is greater than that of the gravity of the movable part.

Magnetic part 34 causes the reluctance force to be held to a value which is greater than that of the gravity even in the upper section of the functional range. In addition, it can be seen that the reluctance force decreases relatively quickly and passes through zero, which defines a point 48 of stable equilibrium. The point 48 of stable equilibrium of movable part 6 is in the upper section or above the functional range of the actuator. If the functional range is provided between 0 and 10 mm, for example, point 48 of stable equilibrium is slightly above that. As mentioned above, this position of stable equilibrium may correspond to a position of the movable part in which metal pin 34 penetrates slightly into the central cutout in the upper magnetic disk. The slope at equilibrium point 48 is relatively sharp, which lends sufficient or improved stability to the equilibrium point in contrast to the actuator shown in FIG. 1.

Since the overall resultant force, represented by curve 46, in response to the absence of a current supply to the coil is above zero up to equilibrium point 48, the movable part shifts under the influence of this overall resultant force starting from any position in the functional range of the actuator, up to the upper point of the stable equilibrium. To that end, it is sufficient that the resultant force is slightly greater than the frictional forces.

FIG. 5 also shows the total force exerted on the movable part when coil 10 is supplied with a certain electric current. This total force is represented by curve 50. In the functional range, this curve is a bit flatter than curve 46 when there is no current supply.

Furthermore, it should be understood that the magnet yoke and the upper magnetic part may have various forms, and that they may be configured such that they optimize the overall reluctance force exerted on the movable part.

What is claimed is:

1. A vertical actuator, comprising:
   a stationary part including a magnet yoke and at least one coil supported by the yoke; and
   a movable part including at least one permanent magnet and movably disposed in an interior of the yoke;
   wherein the stationary part includes an upper magnetic part formed of a magnetic material, the upper magnetic part arranged above the movable part, the upper magnetic part and the yoke magnetically separated from each other by a part formed of a non-magnetic material.

2. The vertical actuator according to claim 1, wherein the permanent magnet is axially magnetized, the movable part including a device configured to close the magnetic field, the device, together with the yoke, forming a magnetic circuit adapted to couple the magnetic field to the at least one coil.

3. The vertical actuator according to claim 2, wherein the device includes a magnetic disk provided on each of an upper end and a lower end of the permanent magnet.

4. The vertical actuator according to claim 1, wherein the permanent magnet is axially magnetized, the movable part including a device configured to close the magnetic field, the device, together with the yoke, forming a magnetic circuit that couples the magnetic field to the at least one coil.

5. The vertical actuator according to claim 1, wherein the permanent magnet is axially magnetized, the movable part including means for closing the magnetic field, the means, together with the yoke, forming a magnetic circuit that couples the magnetic field to the at least one coil.

6. The vertical actuator according to claim 5, wherein the means includes a magnetic disk provided on each of an upper end and a lower end of the permanent magnet.

7. The vertical actuator according to claim 1, wherein the upper magnetic part includes a metal pin having an axis that coincides with a central axis of the movable part.

8. The vertical actuator according to claim 1, wherein the upper magnetic part and the yoke are arranged to direct a reluctance force exerted on the movable part upward, and over an entire functional range of the vertical actuator, the reluctance force having a value slightly greater than a force of gravity to which the movable part is subjected, upon an absence of a current supply to the at least one coil, the vertical actuator has, for the movable part, a point of stable equilibrium located at least one of (a) in an upper section and (b) above the functional range of the vertical actuator.

9. The vertical actuator according to claim 3, wherein the magnetic disk provided on the upper end of the permanent magnet includes a recess adapted to receive a portion of the upper magnetic part.

10. The vertical actuator according to claim 3, wherein the upper magnetic part includes a metal pin, the magnetic disk provided on the upper end of the permanent magnet includes a recess adapted to receive a portion of the metal pin.

11. The vertical actuator according to claim 1, wherein the part formed of the non-magnetic material is arranged as cover of the vertical actuator.

12. The vertical actuator according to claim 1, wherein the upper magnetic part is supported above the movable part by the part formed of the non-magnetic material.

* * * * *